US00RE34602E

United States Patent [19]

Naito et al.

[11] E Patent Number: Re. 34,602

[45] Reissued Date of Patent: May 10, 1994

[54] MULTISTROKE PUNCHING METHOD AND APPARATUS THEREFOR

[75] Inventors: Kinshiro Naito, Isehara; Yoshio Imamura, Hiratsuka, both of Japan

[73] Assignee: Amada Company, Ltd., Japan

[21] Appl. No.: 583,723

[22] Filed: Sep. 17, 1990

Related U.S. Patent Documents

Reissue of:

[64] Patent No.: 4,771,663
Issued: Sep. 20, 1988
Appl. No.: 122,695
Filed: Nov. 19, 1987

[30] Foreign Application Priority Data

Nov. 19, 1986 [JP] Japan ..... 61-273966
Nov. 19, 1986 [JP] Japan ..... 61-273967

[51] Int. Cl.[5] ..... B23D 27/00

[52] U.S. Cl. ..... 83/49; 83/237; 83/529; 83/530; 83/689; 83/916

[58] Field of Search ..... 83/49, 45, 689, 916, 83/529, 530, 237; 72/326, 327, 329, 333

[56] References Cited

U.S. PATENT DOCUMENTS

| | | | |
|---|---|---|---|
| 2,287,168 | 6/1942 | Duncan | 83/689 X |
| 3,728,927 | 4/1973 | Pfleiderer et al. | 83/688 X |
| 3,780,814 | 12/1973 | Herb | 83/916 X |
| 4,007,653 | 2/1977 | Cady | 83/684 X |
| 4,012,975 | 3/1977 | LaLone | 83/916 X |
| 4,481,847 | 11/1984 | Schneider et al. | 83/916 X |
| 4,538,493 | 9/1985 | Perazzolo et al. | 83/530 |
| 4,739,687 | 4/1988 | Wanner et al. | 83/689 X |

FOREIGN PATENT DOCUMENTS

| | | | |
|---|---|---|---|
| 55-9248 | 3/1980 | Japan . | |
| 61-154721 | 7/1986 | Japan . | |
| 532707 | 1/1941 | United Kingdom . | |
| 836866 | 6/1960 | United Kingdom | 83/237 |
| 864333 | 4/1961 | United Kingdom . | |
| 864476 | 4/1961 | United Kingdom . | |
| 922254 | 3/1963 | United Kingdom . | |
| 1307211 | 2/1973 | United Kingdom . | |
| 1323867 | 7/1973 | United Kingdom . | |

*Primary Examiner*—Eugenia Jones
*Attorney, Agent, or Firm*—Wigman, Cohen, Leitner & Myers

[57] ABSTRACT

To eliminate defects such as burr, rollover, sags, scar, etc. from cut-off surfaces of a workpiece in a turret punch press, for instance, a novel height-different punch formed with a lower front edge, an upper rear edge, and an intermediate edge extending between the two edges is used for the punch press. While feeding the workpiece on a horizontal plane in a predetermined direction, the punch is struck by a striker at a first stroke so that the lower front edge thereof cuts off the workpiece partially in cooperation with a die; at the succeeding strokes so that the intermediate edge thereof cuts off the workpiece mincingly and curls refuse within a recess of the die; and at the last stroke so that the upper rear edge thereof cuts curled refuse away from the workpiece to complete a multistroke punching operation.

10 Claims, 7 Drawing Sheets

MULTISTROKE PUNCHING METHOD AND APPARATUS THEREFOR

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a multistroke punching method and an apparatus for punching a workpiece at multistrokes, and more specifically to a method of punching a workpiece at multistrokes without producing burr, rollover, sags, scar, etc., and a hydraulic punch press for punching a workpiece in accordance with the multistroke punching method.

2. Description of the Prior Art

When a slot or a circular hole is formed in a sheet metal workpiece with a press machine such as a turret punch press, conventionally a die having a rectangular or circular edge is moved down toward the workpiece to punch the workpiece at a single stroke or a single strike.

This is because it is rather difficult to adjust or change the stroke of a ram for striking the punch in the case of the conventional turret punch press. Therefore, there exists a problem in that a slot or a hole formed in a sheet metal workpiece is subjected to various defects such as burr, rollover, sags, scar, etc. due to deformation of the cut-off plane of the workpiece, setting errors of the punch and die, or other reasons such as temperature difference or vibrations.

As a result, the punched workpiece should be finished to remove the above-mentioned defects, thus increasing the number of processing steps and therefore cost, and decreasing the precision of the punched product. In addition, there arise another problem such that the product is damaged when the punched product is being finished.

SUMMARY OF THE INVENTION

With these problems in mind, therefore, it is the primmary object of the present invention to provide a method of punching a sheet-like workpiece at multistrokes by controlling punch strokes and workpiece feed positions simultaneously in order to obtain a smooth cut-off surface.

Another object of the present invention is to provide a hydraulic press for enabling multistroke punching operations by controlling punch stroke and workpiece feed positions simultaneously.

To achieve the above-mentioned first object, a method of punching a sheet-like workpiece at multistrokes by a press including a die and a striker, of the present invention comprises the following steps of: (a) preparing a height-different punch formed with a lower front edge, an upper rear edge, and an intermediate edge extending between the two edges; (b) feeding the workpiece on a horizontal plane in a predetermined direction step by step; (c) striking the height-different punch by the striker at a first stroke so that the lower front edge thereof cuts off the workpiece partially in cooperation with the die, (d) repeatedly striking the height-different punch at succeeding strokes so that the intermediate edge thereof cuts off the workpiece mincingly and curls refuse cut off from the workpiece within a recess of the die at such a stroke that the lower front edge of the punch is repeatedly struck by the striker within a stroke between a height below the workpiece and a height within a thickness of the workpiece; and (e) striking the height-different punch at a last stroke so that the upper rear edge thereof cuts curled refuse away from the workpiece to complete multistroke punching operation in cooperation with the die.

To achieve the above-mentioned second objects, an apparatus having a striker for punching a sheet-like workpiece, of the present invention comprises: (a) a height-different punch formed with a lower front edge, an upper rear edge, and an intermediate edge extending between two edges; (b) a die having a recess thereunder and mated with said height-different punch; (c) means for moving the workpiece on a horizontal plane in predetermined . directions, (d) means for controlling strokes of said height-different punch in such a way that in a first stroke, the lower front edge thereof cuts off the workpiece partially in cooperation with said die; at succeeding strokes, the intermediate edge thereof cuts off the workpiece mincingly and curls refuse of the workpiece within the recess of the die, and at a last stroke, the upper rear edge thereof cuts curled refuse away from the workpiece to complete multistroke punching operation in cooperation with the die.

The means for controlling strokes of said height-different punch comprises: (a) a cylinder device for moving a piston provided with a vertically-movable ram for striking said height-different punch; (b) an encoder provided for the piston of said cylinder device, for detecting a vertical motion of the piston; (e) a position detector connected to said encoder for generating a punch position feedback signal; (d) a hydraulic circuit having a servovalve for controllably actuating said cylinder device; and (e) a servovalve controller for controlling said hydraulic circuit on the basis of a vertical punch position feedback signal, target vertical punch position data and vertical punch speed data.

Further, the means for controlling strokes of said height-different punch comprises: (a) a first hydraulic device including a first cylinder for determining a vertical position of said height-different punch whenever said punch is repeatedly struck by the striker at the succeeding strokes so that the intermediate edge thereof cuts off the workpiece mincingly and curls refuse of the workpiece within the recess of the die; and (b) a second hydraulic device including a second cylinder provided with a intervened between the sinker and said punch, for determining a vertical position of said height-different punch when said punch is struck by the striker at the last stroke so that the upper rear edge thereof cuts curled refuse away from the workpiece.

In the method or apparatus of the present invention, since a square or round hole of a workpiece can be formed by punching the workpiece at multistroke little by little by controlling both the punch strokes (vertical motion) and the workpiece feed position (horizontal motion) simultaneously, it is possible to obtain a smooth cut-off surface without producing various defects such as burr, rollover, sags, scar, etc.

BRIEF DESCRIPTION OF THE DRAWINGS

The features and advantages of the method and apparatus for punching a sheet metal workpiece at multistrokes according to the present invention will be more clearly appreciated from the following description taken in conjunction with the accompanying drawings in which like reference numerals designate the same or similar elements or sections throughout the figure thereof and in which.

DETAILED DESCRIPTION OF THE PREFERRED EMBODIMENTS

Figure 1A:
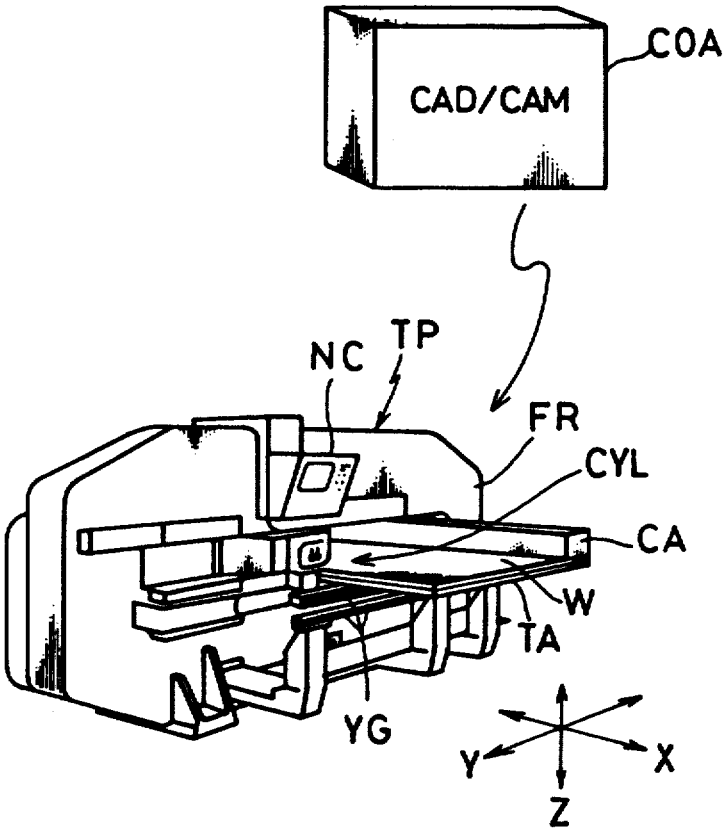
FIG. 1A is a perspective view showing a hydraulic turret punch press to which the method and the apparatus of the present invention are applied.
Figure 1B:
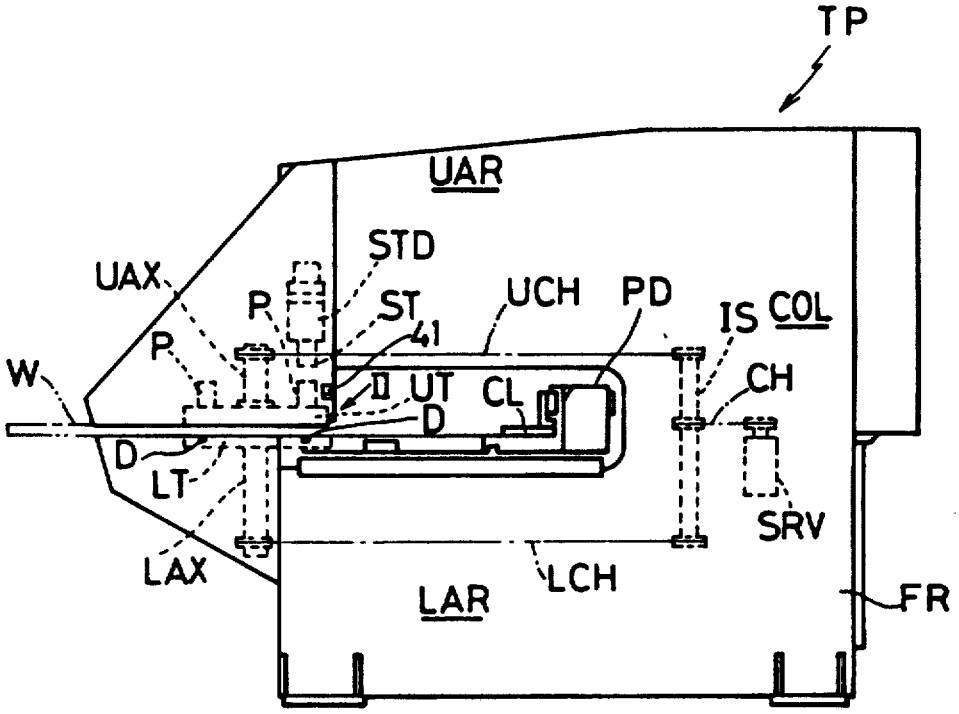
FIG. 1B is an enlarged side view of the hydraulic turret punch press shown in FIG. 1A.

With reference to FIGS. 1A and 1B, a turret punch press to which the method of the present invention is applied will be described hereinbelow.

In FIG. 1, a turret punch press TP is connected to a computer aided design or computer aided manufacturing system COA and equipped in an automatic sheet metal production line.

The turret punch press TP is provided with a frame FR. Within this frame FR, an upper turret and a lower turret both rotatable about a vertical (Z) axis are disposed at a predetermined distance apart from each other. A number of punches are mounted on a horizontal (x-y) surface of the upper turret, and a number of dies each mated with the punches are mounted on a horizontal surface of the lower turret.

A cylinder device CYL provided with a ram movable up and down is disposed on the frame FR. The ram is arranged over the upper turret to strike a punch located therebelow toward a mate die. A Y-axis guide rail YG is provided on the side surface of the frame FR. A movable member guided in the Y-axis direction by a Y-axis servomotor is provided on this Y-axis guide rail YG, and a table TA having free bearings are fixed to the upper surface of the movable member.

A carriage CA movable in the X-axis direction by an X-axis servomotor is provided on the Y-axis end of this table TA. Further, a workpiece clamp device for clamping and guiding a workpiece W mounted on the table TA in the X-Y horizontal plane is provided on the carriage CA.

In the turret punch press TP thus constructed, the carriage CA is guided on an X-Y plane and the cylinder device CYL is driven by an NC system NC so that a workpiece W can be located at a predetermined position and then punched into a predetermined shape.

In more detail, with reference to FIG. 1B, a NC-controlled workpiece moving/positioning device PD is disposed at a gap of the C-shaped frame FR. The workpiece W is clamped by a clamp CL and movable in a direction perpendicular to the paper (X-axis direction) and in the right and left direction (Y-axis direction) in FIG. 1B by the workpiece moving/positioning device PD.

On an upper arm UAR the C-shaped frame FR, an upper turret UT rotatable around an upper axle UAX is suspended. Further, punch assemblies P of various kinds are mounted concentrically on the upper surface of the upper turret UT.

A striker device STD is provided at the upper arm UAR at such a position as to correspond to a punch assembly P disposed on the upper turret UT and at a position the closest to the workpiece moving/positioning device PD. A striker ST is attached to the lower end of the striker device STD to strike the head of the punch P.

On a lower arm LAR of the C-shaped frame FR, a lower turret LT rotatable around a lower axle LAX is disposed. On this lower turret LT, various dies D corresponding to various punches P are arranged with two axes of the punch and die matched with each other.

The upper turret UT and the lower turret LT are driven by a servomotor SRV disposed at a column portion CL of the C-shaped frame in the same direction by the same angular stroke by way of a chain CH, an intermediate shaft IS, two upper and lower chains UCH and LCH, and the upper and lower turret axles UAX and LAX respectively.

Figure 2:
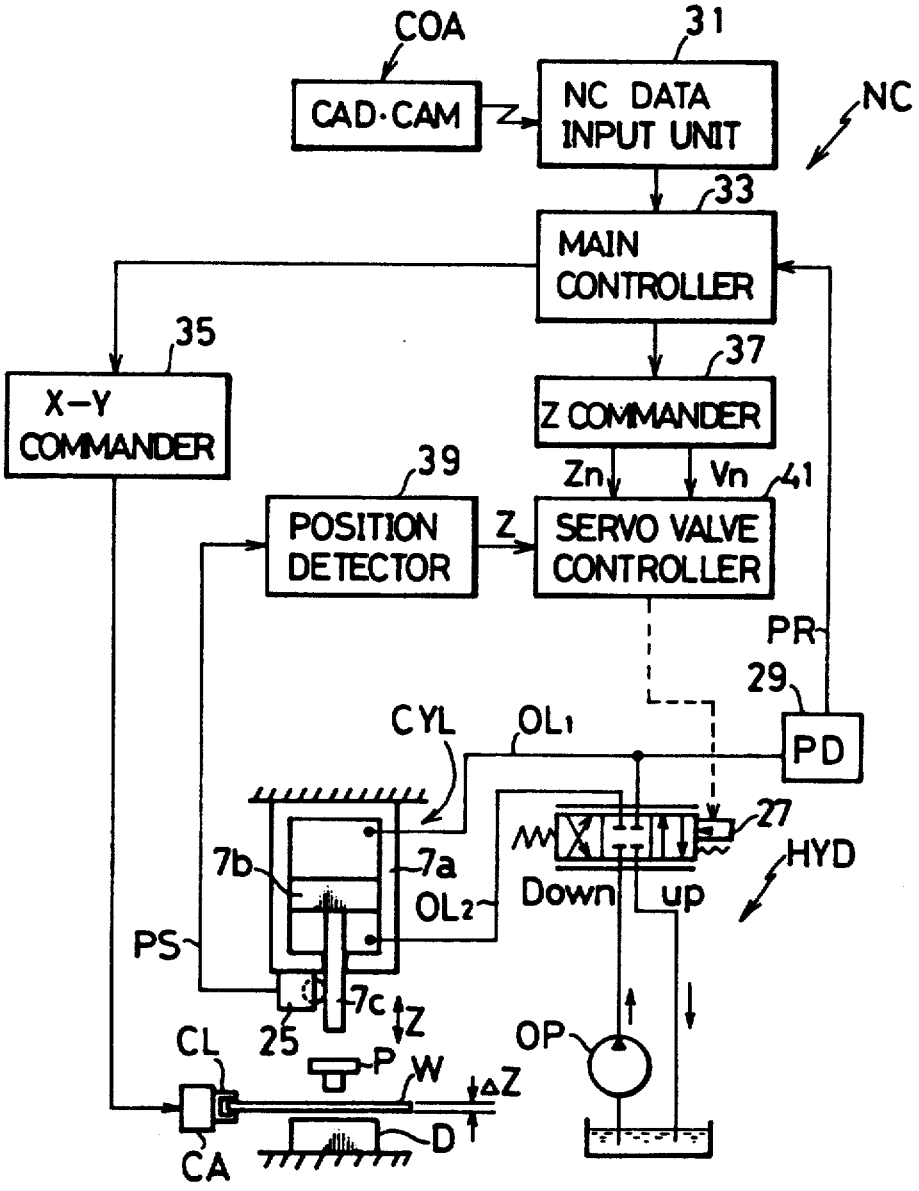
FIG. 2 is a schematic block diagram of a control circuit of the hydraulic turret punch press of the present invention.

FIG. 2 is a schematic block diagram showing the NC system and a control system for the cylinder device CYL and its hydraulic circuit HYD.

In FIG. 2, the cylinder device CYL is provided with a piston 7b, and a ram 7c movable in the vertical (Z-axis) direction is connected to this piston 7b. Further, the reference symbol CL denotes a workpiece clamp device; P denotes a punch; and D denotes a die, respectively. On the lower surface of the cylinder housing 7a, there is mounted an encoder 25 having a roller brought into contact with the ram 7c to detect the movement of the ram 7c as a pulse signal PS.

The hydraulic circuit HYD is composed of a hydraulic pump OP and a servovalve 27 connected between an upper chamber and a lower chamber of the cylinder housing 7a via two hydraulic lines $OL_1$ and $OL_2$. A pressure detector 29 is provided for the hydraulic line $OL_1$ to detect hydraulic pressure in the line as an electric signal.

The NC system NC is composed of an NC data input unit 31, a main controller 33, in X-Y axis commander 35, a Z-axis commander 37, a position detector 39 and a servovalve controller 41.

The NC data input 31 is connected to the CAD/CAM (COA) via off-line or on-line to receive various NC data for controlling the turret punch press and output these data to the main controller 33.

The main controller 33 is operated by an operating system to read the various NC data from the NC data input unit 31. The NC data are mainly used for positioning a workpiece W and for driving the cylinder device CYL. Further, the main controller 33 is connected to various sensors, limit switches, actuators, etc. to control the turret punch press TP concentratedly.

The X-Y axis commander 35 reads position control data from the main controller 33 to drive the X-axis and Y-axis servomotors, so that the workpiece W clamped by the clamp CU can be positioned by the carriage (A) at a predetermined position on the X-Y plane.

The Z-axis commander 37 reads a Z-axis command data from the main controller 33 and outputs a height position data Zn and a speed data Vn to drive the servovalve 27.

The position detector 39 calculates the current position Z of the ram 7c on the basis of the pulse signal PS outputted from the pulse encoder 25. This pulse encoder 25 outputs two pulse signals having two different phases (the difference in phase between the two is ¼). Therefore, the position detector 39 can detect the movement direction of the ram 7c on the basis of these two phase-different pulse signals.

The servovalve controller 41 receives a position data Zn and a speed data Vn from the Z-axis commander 37, and further the current position Z of the ram 7c from the position detector 37. The servovalve controller 41 controls the servovalve 27 to a target position and a target opening rate on the basis of these input values.

As described above, it is possible to control the stroke of the punch [D] *P* by controlling the ram 7c.

Figure 3:
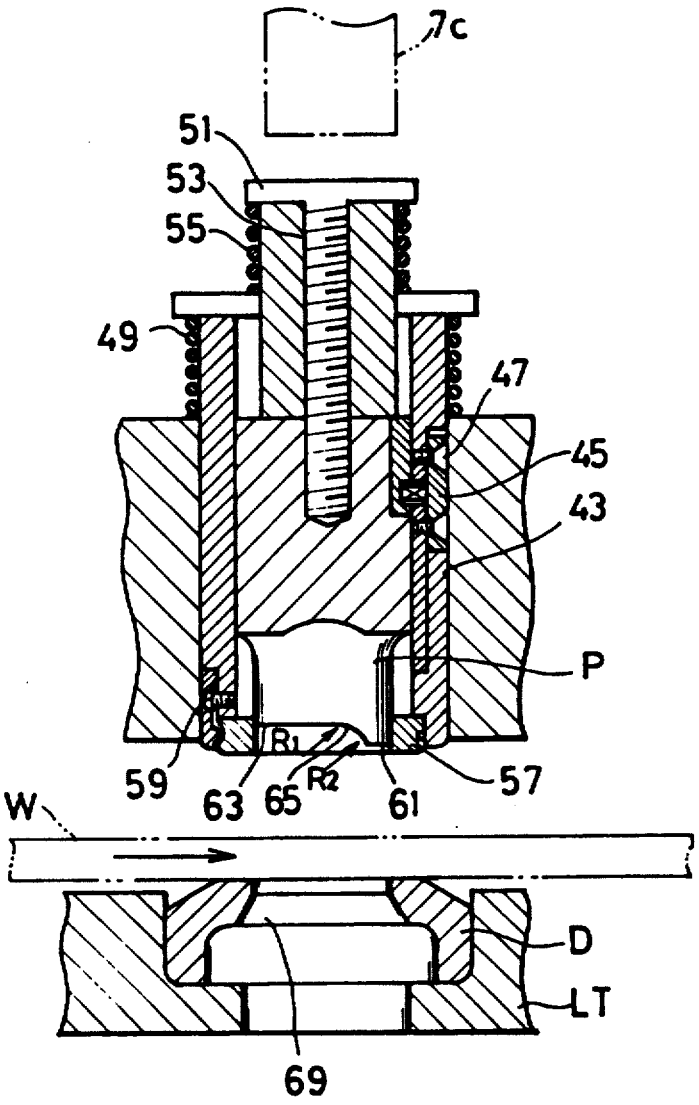
FIG. 3 is an enlarged cross-sectional view showing a height-different punch and a die used for the hydraulic turret punch press of the present invention.

FIG. 3 shows an enlarged cross-sectional view of the punch P and the die D. In the drawing, a punch P is fitted to a hollow cylindrical punch guide 43 via a locating guide key 45. At the outer periphery of the punch guide 43, a lift spring 49 is disposed to urge the punch guide 43 upward away from a workpiece W.

A punch head 51 of the punch P is fixed to the upper side of the punch P with a screw 53. At the outer periphery of the punch head 51, a strip spring 55 is provided to urge the punch P upward away from the workpiece w. At the lower side of the punch guide 43, a stripper plate 57 formed with a hole the same in shape as the punch edge is fixed to the punch guide 43 by a screw 59.

In FIG. 3, the punch P is formed is such a way that the lower edge portion is rectangular in shape and curved in the Z-axis direction or height (referred to as height different edge). That is, the height of edge 61 on the rightside end (lower front side in the travel direction of the workpiece W) is higher than that 63 on the leftside end (upper rear side in the travel direction of the workpiece W). Further, the lower front end poortion 61 of the different height edge is connected to the upper rear end portion 63 thereof by an intermediate edge 65 formed by any given curves. That is, the curved intermediate edge 65 is formed in combination by curves with radii of curvature $R_1$ and $R_2$ so as to be smoothly connected to the front and rear edges 61 and 63. Further, it is also possible to form the intermediate edge 65 in a straight line.

Therefore, when the workpiece W is sequentially processed, a punched-out workpiece can be bent by the curved intermediate edge 65 toward the inside of the die D along a circular arc trace.

To the lower turret LT, dies D mated with the punches P respectively are arranged coaxially with the punches as shown in FIG. 3. The die D is formed with a truncated conical die recess portion 69 so that the punched refuse will not be brought into contact with the die D. Therefore, the punched-off refuse is freely dropped off downward from the workpiece W, as described later in more detail.

Figure 4A:
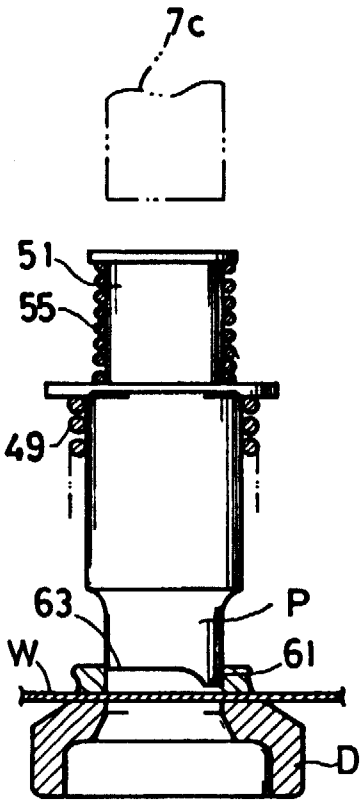
FIGS. 4A to 4D are illustrations for assistance in explaining the multistroke punching operations of the method of the present invention.
Figure 4B:
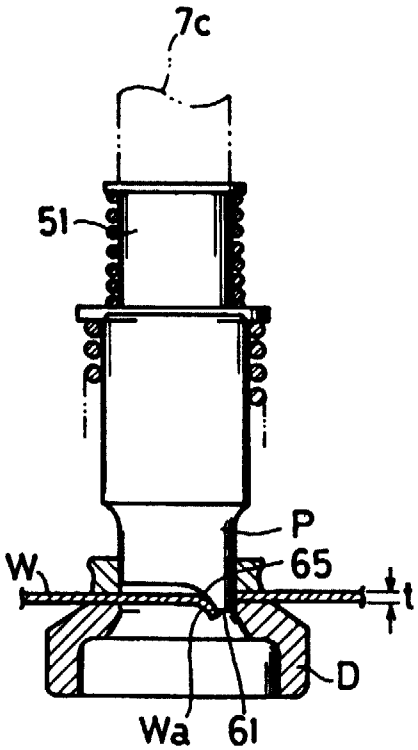

The method of multistroke punching a workpiece W will be explained with reference to FIG. 4. FIG. 4(A) shows a state where the multistroke punching is about to be effected. Under these conditions, the ram 7c is lowered by the cylinder device CYL to strike the head 51 of the punch P. FIG. 4(B) shows the state where the head 51 of the punch P is struck. In this state, the lower front edge 61 of the height different edge of the punch P enters into the die D, so that the workpiece W is cut off by the lower front edge 61. From the state as shown in FIG. 4(B), the ram 7C is moved a little in the upward direction by the cylinder device CYL as shown in FIG. 4C, so that the lower front edge 61 of the punch P is located in height within the thickness t of the workpiece W as shown in FIG. 4C.

Figure 4C:
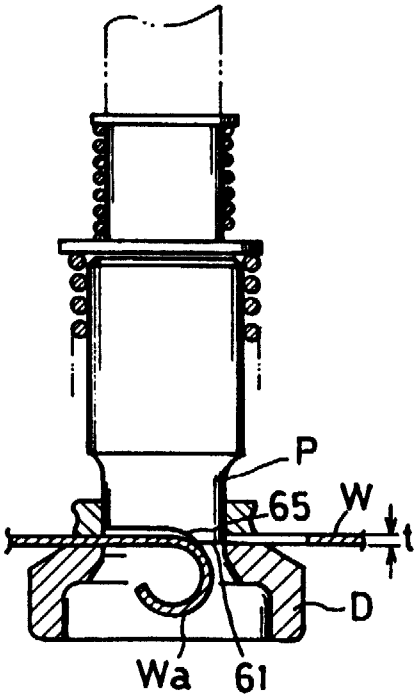
Figure 4D:
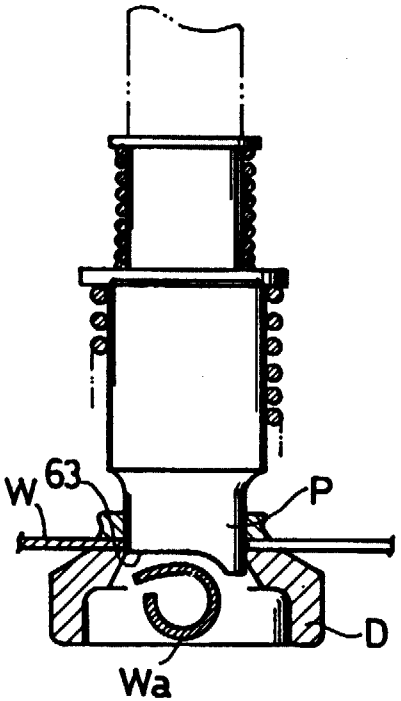

Thereafter, the workpiece is fed forward step by step and the state returns from the one shown in FIG. 4C to the one shown in FIG. 4B. The above two states shown in FIGS. 4B and 4C are repeated; ;that is, the ram 7c is controlled by the hydraulic cylinder device CYL so that the intermediate edge 65 of the punch P is moved up and down as shown for providing the multistroke punching while feeding the workpiece W in the forward direction step by step.

And, when the cut-off refuse Wa is required to cut away from the workpiece W, the stroke of the ram 7c driven by the cylinder device CYL is so controlled as to become larger than that of the ram 7c shown in FIGS. 4B and 4C. That is, when the upper rear end edge 63 of the punch P is lowered beyond the thickness t of the workpiece W as shown in FIG. 4C, the upper rear end edge 63 of the height different edge cuts away the refuse Wa from the workpiece W, thus completing the multistroke punching operation.

Figure 5:
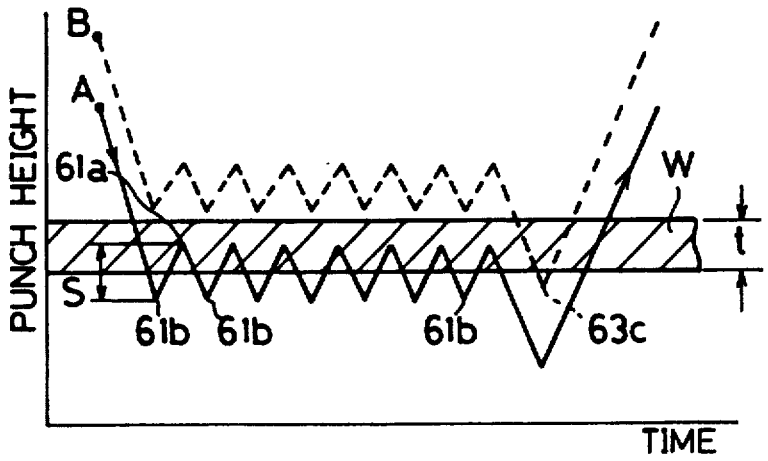
FIG. 5 is a graphical representations for assistance in explaining the multistrokes of the punch in the method of the present invention.

FIG. 5 shows the strokes of the lower front end edge 61 and the upper rear end edge 63 of the height different edge of the punch P with respect to the sequential processing time.

In the drawing, points A and B represent the positions of the lower front end edge 61 and the upper rear end edge 63 of the height difference edge, respectively before the multistroke punching. That is, the solid lines indicate the multistroke punch processing locus of the lower front end edge 61, while the dashed lines indicate the multistroke punch processing locus of the upper rear end edge 63.

In FIG. 5, the upper stroke limits 61a of the lower front edge 61 lie within the thickness t of the workpiece W, and the lower stroke limits 61b thereof lie below the thickness t of the workpiece W. Therefore, the stroke of the lower front edge 61 is a distance S. To drop the cut-off refuse WA, the above stroke S of the punch 21 is increased to such an extent that the lower stroke limit of the upper rear edge 63 goes down to a position 63c below the thickness t of the workpiece W. However, it is of course possible to modify he upper stroke limits without being limited to the distance S shown in FIG. 5.

By the above-mentioned multistroke punching operation, it is possible to achieve high precious sequential processing without producing flow or scar due to contact pressure called sagging.

Further, the refuse produced by the sequential processing is bent within the die along the curved portion of the curved intermediate edge, curled describing a circular arc, and further guided into the truncated conical die recess 69, before being cut away without being brought into contact with the die.

Further, without being limited to the above multistroke operations shown in FIG. 5, it is of course possible to control the multistroke of the punch in accordance with an any give curve.

In the above embodiment of the turret punch press. the ram cylinder device CYL is controlled by the hydraulic circuit HYD driven by the servovalve controller 41 on the basis of a command signal from the Z axis commander 37 and a feedback signal from the position detector 39 in feedback control system having a feedback loop.

Without being limited thereto, however, the turret punch of the present invention can be operated in accordance with forward (direct) control system.

FIGS. 6A to 6D show an example of the steps of multistroke punching a workpiece W in accordance with the forward control system.

In these drawings, a punch stroke stopper device 141 is disposed in the vicinity of the punch P to control the punch stroke.

In more detail, the stopper device 141 is composed of air cylinders 143 and 145 and is disposed on the upper arm UAR of the frame FR (shown in FIG. 1). A piston rod 147 extending in the leftward direction is attached to an end of an air cylinder 143 so as to be movable in the right and left directions. A piston rod 149 is attached to an end of an air cylinder 145, and a spacer 151 is fixed to an end of the piston rod 149. Therefore, when the piston rod 149 moves in the horizontal direction, the spacer 131 is also moved to and fro.

Figure 6A:
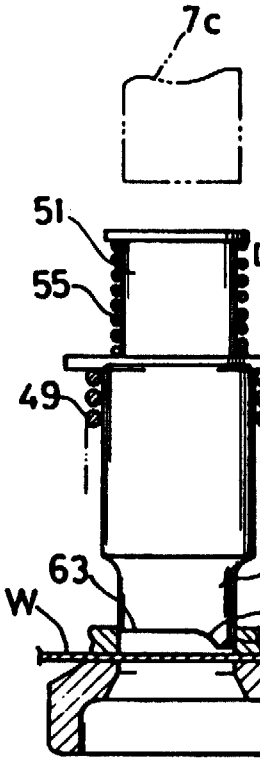
FIGS. 6A to 6D are illustrations for assistance in explaining the multistroke punching operations of another embodiment of the method of the present invention.
Figure 6B:
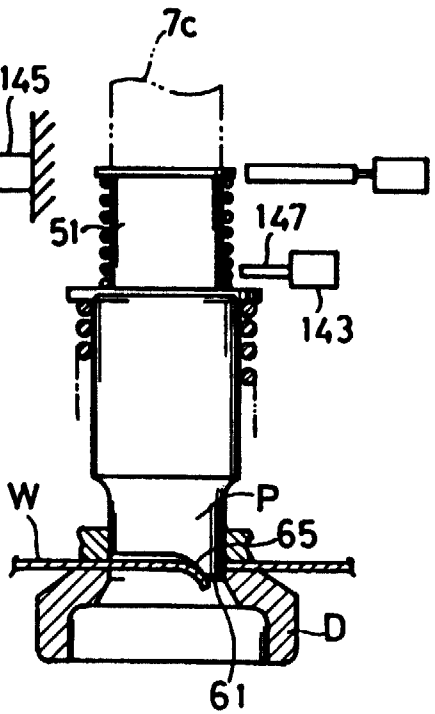

The multistroke punching operation of workpiece W will be explained with reference to FIGS. 6A to 6D. FIG. 6(A) shows a state where the multistroke punching is about to be effected. Under these conditions, the striker 7c is lowered by a striking device (not shown) to strike the head 51 of the punch P. FIG. 6(B) shows the state where the head 51 of the punch P is struck. In this state, the lower front edge 61 of the height different edge of the punch P enters into the die D, so that the workpiece W is cut off by the lower front edge 61. From the state as shown in FIG. 6A, the cylinder 143 of the stopper device 141 is operated to move the piston rod 147 in the leftward in FIG. 6B to the vicinity of the outer circumference of the head 51 of the punch P.

Figure 6C:
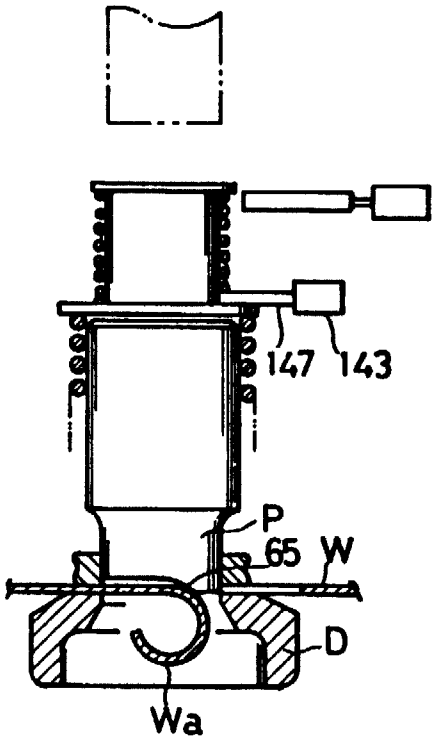
Figure 6D:
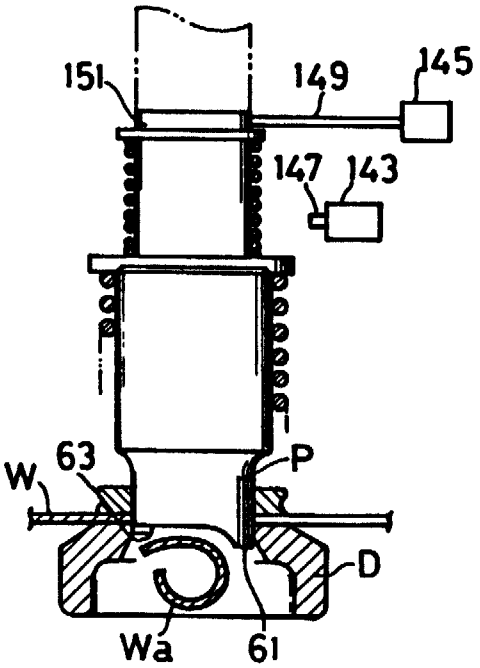

When the striker 7c is moved upward from the state shown in FIG. 6(B), the upward moment of the punch P is restricted by the piston rod 147 as shown in FIG. 6(C) at a position where the upper end surface of the punch P is brought into contact with the lower side of the piston rod 147.

By lowering the striker 7c with the striking device as shown in FIG. 6(B). multistroke punching operations are repeated at a predetermined small stroke of the punch P. When the cut refuse Wa is required to cut away from the workpiece W, the cylinder 143 is operated to return the piston rod 147 to the original position and simultaneously the cylinder 145 is operated to extend the piston rod 49 in the leftward direction in FIG. 6(D) so that the spacer 51 is located on the head 51 of the punch P. Under these conditions, when the striker 7c is lowered, the upper rear end edge 63 of the height different edge of the punch P cuts away the cut-off refuse Wa from the workpiece W because the spacer 151 is sandwiched between the striker 7c and the head 51 of the punch P, thus the multistroke punching operations end.

As understood from the description of the above embodiment, since the lower end edge and the intermediate edge of the punch are repeatedly controlled to a predetermined stroke to partially cut a workpiece by controlling the stroke of the hydraulic cylinder of the hydraulic press and then the upper end edge of the punch is controlled to a further larger predetermined stroke to cut away a refuse from the workpiece by controlling the stroke of the hydraulic cylinder, it is possible to effect the multistroke punching processing easily, without producing "sags" or scar, at high precession.

Further, according to the present invention, the lower portion of the punch is formed into rectangular shape and different height in such a way that the front edge provided on the forward side of the multistroke punching travel direction is higher than rear edge provided on the rear side thereof and an intermediate edge of any given curve is formed between both the front and rear end edges. Therefore, the refuse is well curled to facilitate the succeeding processing, and the processed surface is smooth.

What is claimed is:

1. A method of punching a sheet-like workpiece at multistrokes by a press including a die and a striker, which comprises the following steps of:

(a) preparing a height-different punch formed with a lower front edge, an upper rear edge, and an intermediate edge extending between the [two edges] *lower front edge and the upper rear edge;*

(b) feeding the workpiece on a horizontal plane in two predetermined directions step by step;

(c) striking the height-different punch by the striker at a first stroke so that the lower front edge thereof cuts off the workpiece partially in cooperation with the die;

(d) repeatedly striking the height-different punch at succeeding strokes so that the intermediate edge thereof cuts off the workpiece mincingly and curls refuse cut off from the workpiece within a recess of the die at such a stroke that the lower front edge of the punch is repeatedly struck by the striker within a stroke between a height below the workpiece and a height within a thickness of the workpiece; and (e) striking the height-different punch at a last stroke so that the upper rear edge thereof cuts curled refuse away from the workpiece to complete multistroke punching operation in cooperation with the die[;].

2. An apparatus having a striker for punching a sheet-like workpiece, which comprises:

(a) a height-different punch formed with a lower front edge, an upper rear edge, and an intermediate edge extending between [two edges] *the lower front edge and the upper rear edge;*

(b) a die having a recess thereunder and mated with said height-different punch;

(c) means for moving the workpiece on a horizontal plane in predetermined directions;

(d) means for controlling strokes of said height-different punch in such a way that in a first stroke, the lower front edge thereof cuts off the workpiece partially in cooperation with said [diee] *die; at succeeding strokes, the intermediate edge thereof cuts off the workpiece mincingly and curls refuse of the workpiece within the recess of the die; and at a last stroke, the upper rear edge thereof cuts curled refuse away from the workpiece to complete multistroke punching operation in cooperation with the die.*

3. The apparatus as set forth in claim 2, wherein said means for controlling strokes of said height-different punch comprises:

(a) a cylinder device for moving a piston provided with a vertically-movable ram for striking said height-different punch;

(b) an encoder disposed for the piston of said cylinder device, for detecting a vertical motion of the piston;

(c) a position detector connected to said encoder, for generating a punch position feedback signal;

(d) a hydraulic circuit having a servovalve for controllably actuating said cylinder device; and (e) a servovalve controller for controlling said hydraulic circuit on the basis of a vertical punch position feedback signal, target vertical punch position data and vertical punch speed data.

4. The apparatus as set forth in claim 2, wherein said means for controlling strokes of said height-different punch comprises:

(a) a first hydraulic device including a first cylinder for determining a vertical position of said height-different punch whenever said punch is repeatedly struck by the striker at the succeeding strokes so that the intermediate edge thereof cuts off the workpiece mincingly and curls refuse of the workpiece within the recess Of the die; and (b) a second hydraulic device including a second cylinder provided with a spacer intervened between the striker and said punch, for determining a vertical position of said height-different punch when said punch is struck by the striker at the last stroke so that the upper rear edge thereof cuts curled refuse away from the workpiece.

*5. A punch tool for a press for punching a sheet-like workpiece by cutting a predetermined length of curl of a curled refuse away from the workpiece, comprising:*

*a punch guide adapted to be mounted on a punch tool support means of the punch press, the punch guide being formed with a through hole having a longitudinal axis;*

*a punch fitted in the through hole of the punch guide, said punch being movable in the direction of the longitudinal axis of the through hole, between a rest position in which a tip section of the punch is located within the punch guide, and a working position in which the tip section protrudes from the punch guide for performing a multiple stroke punching operation:*

*a punch head provided on the punch, the punch being moved toward the working position by a strike of a ram of the punch press against the punch head:*

*a spring provided between the punch head and the punch guide for urging the punch toward the rest position;*

*said tip section of the punch having a shape of a rectangle in cross-section; the tip section being formed with a high edge section at one side of the rectangle in the transverse direction thereof, a low edge section formed at and extending along the opposite side of the rectangle, and a curved intermediate edge section extending between said high and tow edge sections; wherein, in the process of the punching operation, at a first stroke the low edge section is adapted to break through the workpiece to form a break therein, at repeated second strokes the intermediate edge section is adapted to widen the break, thereby forming a curled refuse and at a last stroke the high edge section is adapted to cut off the refuse from the rest of the workpiece to complete a punching operation.*

*6. The punch tool claim 5, wherein a curve of the curved intermediate edge section comprises a first curved section of a radius R1 and a second curved section of a radius R2.*

*7. The punch tool of claim 5, wherein the through hole of the punch guide and a body of the punch have a cylindrical shape, and the punch is provided with a key for preventing the punch from rotating in the through hole.*

*8. The punch tool of claim 5, wherein the length of the curl is larger than the width of the tip section of the punch.*

*9. A punch tool as in claim 5, wherein the transverse dimension of the tip section is larger than the diameter of the curled shape of the workpiece refuse formed by multiple punchings.*

*10. An apparatus having a punch tool for punching a sheet-like workpiece by cutting a predetermined length of curl of a curled refuse away from the workpiece, which comprises:*

*(a) a punch tool for a punch press, including:*

*(i) a punch guide adapted to be mounted on a punch tool support means of the punch press, the punch guide being formed with a through hole having a longitudinal axis;*

*(ii) a punch fitted in the through hole of the punch guide, said punch being movable in the direction of the longitudinal axis of the through hole, between a rest position in which a tip section of the punch is located within the punch guide, and a working position in which the tip section protrudes from the punch guide for performing a punching operation;*

*(iii) a punch head provided on the punch, the punch being moved toward the working position by a strike of a ram of the punch press against the punch head;*

(iv) a spring provided between the punch head and the punch guide for urging the punch toward the rest position;

*(v) said tip section of the punch being formed with a high edge section, a low edge section, and a curved intermediate edge section extending between said high and low edge sections; wherein, in the process of the punching operation, the low edge section breaks the workpiece to form a break therein at a first step, the intermediate edge section widens the break at a second step, and the high edge section cuts off a refuse of the workpiece from the rest of the workpiece at a third step to complete a punching operation;*

*(b) a die having a recess thereunder and mated with said punch tool;*

*(c) means for moving the workpiece on a horizontal plane in predetermined directions;*

*(d) means for controlling strokes of said punch tool in such a way that in a first stroke, the low edge section thereof cuts off the workpiece partially in cooperation with said die; at succeeding strokes, the intermediate edge section thereof cuts off the workpiece mincingly and curls refuse of the workpiece within the recess of the die; and at a last stroke, the high edge section curls refuse away from the workpiece to complete a multistroke punching operation in cooperation with the die.*

* * * * *

UNITED STATES PATENT AND TRADEMARK OFFICE

CERTIFICATE OF CORRECTION

PATENT NO. : Re. 34,602

DATED : May 10, 1994

INVENTOR(S) : Kinshiro NAITO et al

It is certified that error appears in the above-identified patent and that said Letters Patent is hereby corrected as shown below:

Claim 5, column 9, line 40, after "a" insert --multiple stroke--.

Signed and Sealed this

Eleventh Day of October, 1994

Attest:

Bruce Lehman

BRUCE LEHMAN

Attesting Officer

Commissioner of Patents and Trademarks